C. M. FEIST.
WHEEL BEARING.
APPLICATION FILED DEC. 23, 1918.
1,344,495.  Patented June 22, 1920.
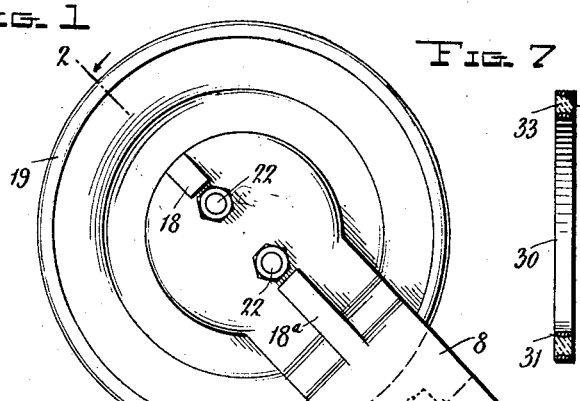
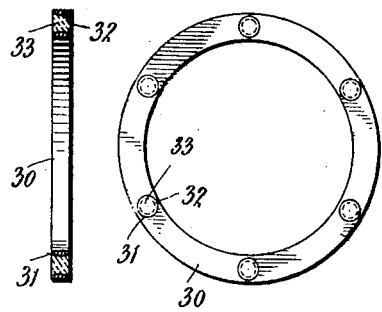
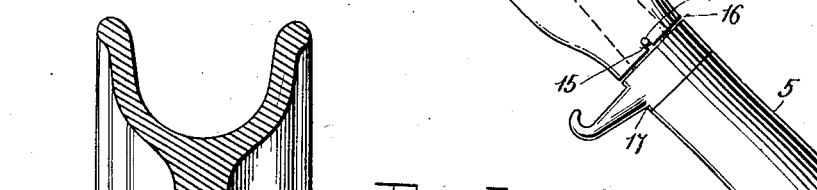
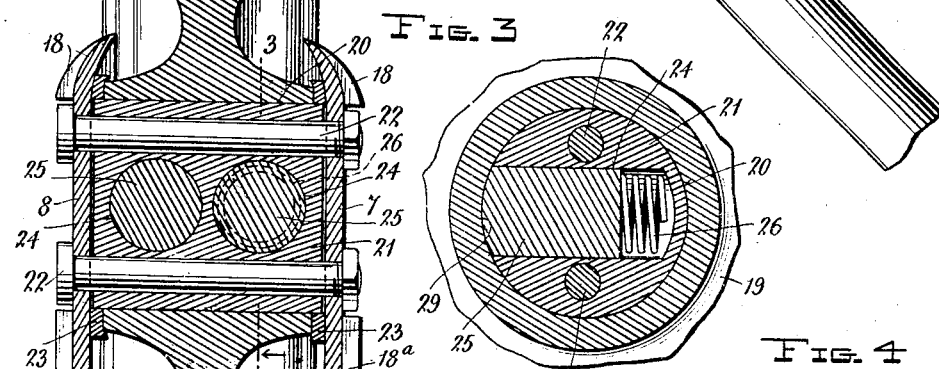
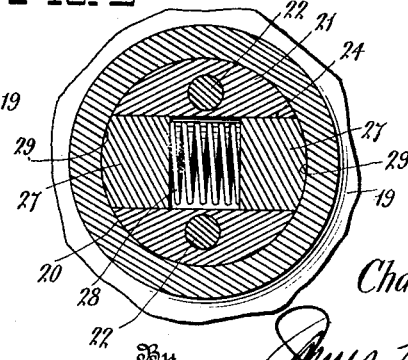
Inventor
Charles M. Feist,

UNITED STATES PATENT OFFICE.

CHARLES M. FEIST, OF SIOUX CITY, IOWA.

WHEEL-BEARING.

1,344,495.  Specification of Letters Patent.  Patented June 22, 1920.

Application filed December 23, 1918. Serial No. 267,989.

*To all whom it may concern:*

Be it known that I, CHARLES M. FEIST, a citizen of the United States, residing at Sioux City, in the county of Woodbury and State of Iowa, have invented new and useful Improvements in Wheel-Bearings, of which the following is a specification.

This invention relates to wheels and bearings of that type having self-lubricating characteristics, and particularly to trolley wheels, and the general object of the invention is to improve wheel bearings by providing a self-lubricating organization having a comparatively simple construction and convenient assemblage of parts to produce a practical and efficient operation of a wheel relatively to its bearing and which may be readily taken apart for renewal of worn elements thereof. A specific object of the invention is to provide a self-lubricating bearing, particularly adapted to trolley wheels having a readily removable one-piece axle, with preferably straight bores therethrough for retention of a lubricant and reception of fastening devices, and wherein the bearing surfaces accurately fit and have an efficient electrical contact between the wheel and axle and the supporting means therefor, and also to so arrange the lubricant in the axle that it will not in the least interfere with the electrical contact between the wheel and the axle.

With these and other objects and advantages in view, the invention consists in the construction and arrangement of parts which will be more fully hereinafter described and claimed.

The present invention is an improvement on the wheel and bearing disclosed by my prior Patents No. 796,829 of August 8, 1905, and No. 1,172,965 of February 22, 1916, and my pending application Serial No. 240,061, filed June 14, 1918.

The accompanying drawing illustrates the improved bearing applied to an electric trolley wheel harp and pole to demonstrate one particularly preferred application thereof, and in the subjoined description the bearing will be disclosed in detail in connection with such type of trolley wheel as one practical illustration of the advantages of the improvements. The features of improvement, however, are equally well applicable to other forms of bearings and wheels, and are specially adapted for use in connection with packing house meat trolleys.

In the drawing:—

Figure 1 represents a side elevation showing a trolley wheel and harp embodying the features of the invention.

Fig. 2 represents a transverse section, on an enlarged scale, on the line 2—2, Fig. 1.

Fig. 3 represents a section on the line 3—3, Fig. 2.

Fig. 4 represents a detail perspective view of one of the lubricating plugs.

Fig. 5 represents a section similar to Fig. 3 showing a slight modification.

Figs. 6 and 7 respectively represent a detail elevation and transverse section of a modified form of washer usable in the improved bearing.

The numeral 5 designates a socket at the upper end of the usual form of trolley pole, said socket having a tapered coupling rod or post 6 secured therein and projecting above the socket terminal any suitable distance to removably engage and support the harp and trolley wheel. The harp as shown comprises a pair of fork jaws or sections 7 and 8 of duplicate construction and provide halves of the harp. The rod or post 6 has a pin 14 projecting outwardly therefrom to engage a slot 15 in the lower end of one of the harp halves or sections to provide for alinement of the harp and trolley wheel relatively to said rod or post and the trolley pole. Between the upper end of the socket 5 and the lower ends of the sections 7 and 8 a space 16 is left for mounting the rope swivel 17. The outer sides of the fork jaws or sections 7 and 8 are also provided with corresponding ribs 18 and 18$^a$ which serve to deflect the trolley wire past the securing bolt edge and nuts for the harp jaws or sections, should the trolley wheel for any reason leave the trolley wire when an endeavor is made to dispose the said wheel in engagement with the wire, thereby avoiding damage to the trolley wire and over-head electrical construction. The upper portion of the harp is recessed to receive the grooved trolley wheel 19 which has an enlarged central eye or cylindrical bore 20 of equal diameter throughout its length to rotatably fit a spool-like axle or bearing 21 which is also cylindrical and of equal diameter throughout its length and held fixed between the harp jaws or sections 7 and 8 and held immovable by bolts 22 extending transversely through the jaws and the axle or bearing above and below the longitudinal center of the latter. The opposite ends of the spool-like axle or bearing 21 are adjacent to the inner sides of the harp jaws or sections 7 and 8 and surrounding the opposite ends of the axle or bearing are washers 23 preferably formed of fiber or other anti-frictional material and between which the grooved trolley wheel 19 is mounted to rotate, the said washers preventing cutting of the axle or undue wear by the wheel hub on the said axle bearing at the opposite edge ends of the hub adjacent to the axle. It will, therefore, be seen that in the present construction one of the essential differences relatively to that disclosed in my pending application Serial No. 240,061 is that the axle or bearing is made of one piece and is straight and the bore of the trolley wheel is also cylindrical and straight from end to end of the wheel hub. This improved structure will result in a material reduction of cost in the construction of this form of bearing and also facilitate assemblage and association of the several parts. As in my prior construction, the present improved bearing is provided with means for inducing easy running movement and to reduce frictional wear of the trolley wheel on its axle or bearing, and the said means consists, in the present instance, of lubricating devices mounted in the axle or bearing. These lubricating devices, as shown by Figs. 2 and 3, may be of duplicate form or two exposures of lubricating material at opposite portions of the axle or bearing may be provided, or, as shown by Fig. 5, four exposures, or two at opposite portions of the opposite portion of the axle or bearing, may be used. To accommodate the lubricating means, the axle or bearing 21 between the points where the bolts 22 pass therethrough is formed with enlarged bores or sockets 24 which extend entirely therethrough, these bores or sockets being preferably straight, though it will be understood that they might be curved, but in all constructions they are disposed in planes at angles to the bolts 22. As shown by Figs. 2 and 3, each socket or bore 24 extends partially outwardly through the axle or bearing 21 at one of its extremities and is closed at its opposite extremity by reason of the fact that the said socket or bore projects only partially through the axle or bearing. In the slightly modified form, as shown by Fig. 5, each socket 24 extends completely through the axle or bearing 21 and thereby has a double opening at opposite portions of the said axle or bearing. In the form of the bearing as shown by Figs. 2 and 3, a single plug 25 of any suitable kind of lubricating material is mounted in the socket 24 and is exposed at one end through the open end of said socket, a spring 26 being introduced between the opposite end of the plug and the adjacent closed end wall of the socket. In this form of the device the sockets 24 open reversely relatively to opposite portions of the axle or bearing and as a consequence the plugs 25 and the springs 26 will have a corresponding reverse position in the two sockets and whereby the bore 20 of the hub of the wheel 19 will receive lubricating material at all times at diametrically opposite portions thereof, and as the wheel rotates on the axle or bearing 21 the bore will become thoroughly lubricated and thereby render the movement of the wheel very easy. In the form of the lubricating means as shown by Fig. 2, two plugs 27 are provided in each socket 24 and the outer ends of the pairs of plugs are uniformly exposed at opposite portions of the axle or bearing 21, a spring 28 being interposed between the pairs of plugs. It will be understood that the springs 26 and 28 operate to gradually feed the plugs outwardly or to expose the outer ends thereof in engaging relation relatively to the bore 20 of the hub of the wheel 19. As in my pending application hereinbefore referred to, the lubricating plugs will be composed of compressed plumbago or other lubricating material or composition of materials, the plugs having sufficient rigidity to hold them in place which is due to the compression thereof. The outer ends 29 of the plugs will be shaped to conform to the interior contour of the bore 20 of the hub of the wheel 19, and owing to the concavity of the said bore, the ends of the plugs will necessarily be convex.

Instead of the washers 23 as shown by Fig. 2, the modified form of washer shown by Figs. 6 and 7 may be used and will be used in many forms of the bearing. This modified form of washer 30 is formed with a series of openings 31 having the walls diverging from the center 32 as shown to hold a graphite or other lubricant 33 intact therein and expose the same at opposite sides of the washer as an additional lubricating means to further reduce friction and prevent wear or cutting of the washer by the end edges of the hub 21.

The improved form of the trolley wheel and bearing, whether used in connection with trolley or other wheels, materially reduces the cost of the construction of self-lubricating bearings, and as hereinbefore noted, it is proposed to apply the features of improvement in connection with any form of wheels where they may be practically used.

What is claimed is:

1. A bearing for wheels comprising a fixed axle having a cylindrically straight periphery and transversely bored at the center thereof to form seats, a wheel having a central straight bore therethrough and rotatably mounted on the axle, harp members having the axle disposed between the upper extremities thereof, bolts extending transversely through the harp members and the axle above and below the longitudinal center of and the seats in the said axle, and lubricating plugs movably mounted in the said seats of the axle and having outer operating ends extending in reverse directions relatively to the axle at opposite portions of the body of the latter to terminally contact with the bore of the wheel.

2. The combination with opposite members of a harp, of a single piece axle disposed between the upper extremities of the said members and having a cylindrically straight periphery, bolts extending through the said members and the axle above and below the longitudinal center of the said axle to fix the latter between the members, the axle being transversely bored in the central portion thereof between the bolts to provide oppositely opening seats, a wheel rotatably mounted on the axle, washers mounted over the opposite ends of the axle and having the opposite ends of the hub of the wheel confined therebetween, the washers having their outer sides engaging the inner sides of the harp members, and lubricating devices movably mounted in the said seats and having outer ends exposed in reverse positions through the axle to engage the wall of the wheel hub adjacent thereto.

3. A bearing for wheels comprising a fixed axle having a cylindrically straight periphery and composed of a single piece of material, a mounting having side members applied to opposite ends of the axle, the axle having central reversely extending transverse bores to form outwardly opening seats, bolts extending through the side members of the mounting and the axle above and below the longitudinal center of the latter to fix the axle to the said members, a wheel having a central straight bore therethrough and rotatably mounted on the said axle, and lubricating plugs having a self-feeding movement in the seats of the axle and extending outwardly in reverse directions in planes at right angles to the bolts to dispose the outer ends of the plugs in opposite portions of the body of the axle to terminally contact with different portions of the bore of the wheel.

In testimony whereof I have hereunto set my hand in presence of two subscribing witnesses.

CHARLES M. FEIST.

Witnesses:
H. N. LONG,
O. G. HARTMAN.